Inventors
George A. Stone
Earnest H. Briscoe
Lorrin C. Tarlton
By W. S. McDowell
Attorney Inventors
George A. Stone
Earnest H. Briscoe
Lorrin C. Tarlton By W. S. McDowell

UNITED STATES PATENT OFFICE 2,572,695

ELECTRICAL HEATING JACKET FOR LABORATORY APPARATUS

Earnest H. Briscoe, Columbus, George A. Stone, Gahanna, and Lorrin C. Tarlton, Reynoldsburg, Ohio, assignors, by mesne assignments, to Briscoe Manufacturing Company, Columbus, Ohio Application June 26, 1948, Serial No. 35,454

2 Claims. (Cl. 219—44)

The present invention relates to electrical heating apparatus, and more specifically to electrical heating jackets of the type used in heating various laboratory apparatus, such as flasks, retorts, funnels, distillation tubes, and the like, or in heating various other containers or conduits.

In the past, various types of electrical heating instrumentalities have been proposed for use in connection with laboratory apparatus in conducting tests or experiments wherein it was desired to impart to a receptacle or conduit an even heat, and to have such heat distributed over a relatively wide area of the receptacle in order that a substantially constant temperature might be obtained within the material contained in the receptacle or being conducted through the conduit.

It is well known that electrical heating equipment is far superior to other types of heating equipment with regard to evenness of heat transmission, speed of heat application, and critical control over operational temperatures. However, the primary objections to the use of electrical heating equipment for laboratory purposes arose through the inability of previous electrical heating devices to efficiently transmit or transfer heat realized thereby to an object to be heated by the device. Further, previous types of electrical heaters failed to provide for proper thermal insulation of the heater and the associated object to be heated, with the result that a large percentage of heat energy was completely lost, thereby greatly increasing the operational costs of such heaters.

Another obstacle to the efficient operation of electrical heating devices of this character is encountered when considering the physical characteristics required of heating devices used to support and heat the relatively fragile glass instrumentalities used in performing laboratory experiments. First, it is necessary to provide a support for both the electrical heating element and the object to be heated thereby. In the case of glass or relatively fragile objects, it is desirable to provide a somewhat flexible or yieldable supporting body capable of absorbing both internal and external shocks which would ordinarily result in breakage of the associated objects. Secondly, the supporting medium for the electrical heating element must be sufficiently flexible to closely conform to the general shape of the object to be heated, or a portion thereof, in order to effectively and efficiently transfer heat to such object. Lastly, the supporting medium must be capable of withstanding relatively elevated temperatures without deterioration or disintegration.

Accordingly, it is the primary object of this invention to provide an improved type of electrical heating jacket for various types of laboratory apparatus which embodies an electrical heating element and a supporting medium for the element and the apparatus to be heated thereby which is flexible, and which is capable of withstanding relatively extremely elevated temperatures without being detrimentally affected thereby.

It is another object of the present invention to provide an electrical heating jacket which provides a substantially enclosed chamber for the reception of a flask or tube or the like, or a portion thereof, and which is formed from a material which is both heat-resistant and possesses good dielectric properties whereby an associated electrical resistance wire may be intimately carried by the jacket in close, but electrically insulated, relation to an object to be heated.

It is a further object of this invention to provide an electrical heating jacket for laboratory apparatus which comprises an outer casing of resin-impregnated glass fabric, and an inner flexible vessel-supporting wall of glass fabric which carries upon the outer surface thereof an electrically insulated resistance wire for substantially direct contact with a vessel to be heated by the jacket, whereby a faster and more critical control over the heat transfer to a vessel being heated may be obtained through the elimination of excessive thermal insulation disposed between the resistance wire and the object to be heated thereby.

Yet another object of this invention is to provide an electrical heating jacket of the character described which embodies an electrical heating element, or elements, which are formed from integrally knitted and braided flexible strands of resistance wire and glass, with the resistance wire being arranged in closely spaced transverse convolutions throughout the length of the heating element, whereby to provide an increased area of heat transmission within a relatively small space, and due to the length of resistance wire utilized, provides a non-incandescent heating element which tends to greatly reduce the hazards encountered when heating volatile or combustible materials with such jackets.

Still a further object of the present invention is to provide an electrical heating jacket of the character described which incorporates a pre-set thermo-responsive switch joined in series with the electrical resistance element and arranged relative to the resistance element so as to be directly affected by the heat energy emanating from the latter, whereby to open the electrical circuit of the heater when the same reaches a desired maximum operating temperature to prevent damage to the material of the heating jacket and an object being heated thereby.

For a further and more detailed understanding of the present invention and the additional objects and advantages realized therefrom, reference is made to the following description and the accompanying drawings, wherein.

Figure 1:
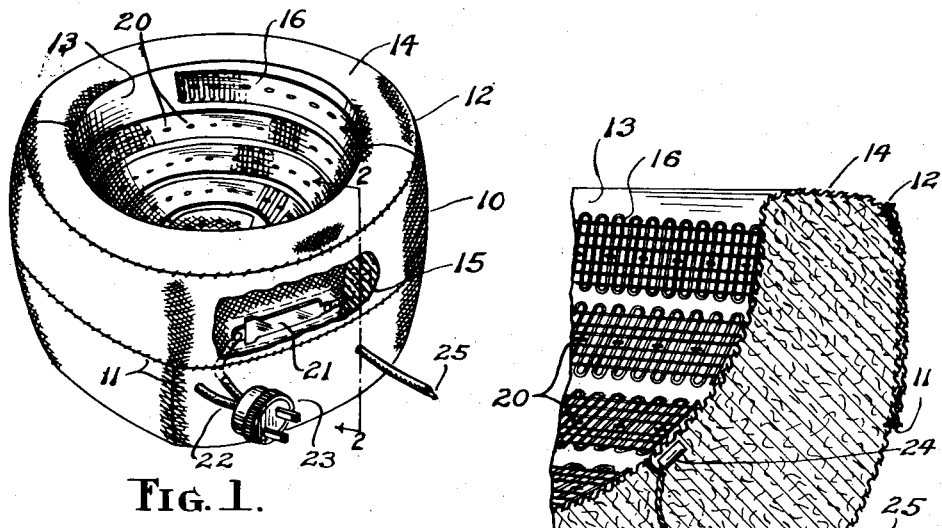
Fig. 1 is a perspective view of an electrical flask-heating jacket formed in accordance with the present invention.
Figure 2:
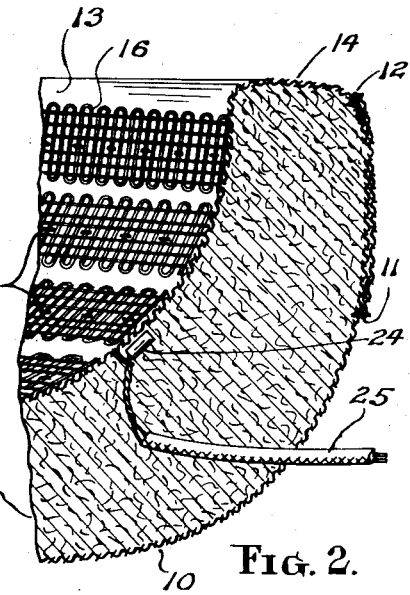
Fig. 2 is an enlarged fragmentary vertical sectional view taken along the line 2—2 of Fig. 1.

Referring now to the drawings, Figs. 1 and 2 illustrate a substantially hemispherical type of electrical heating jacket which is primarily adapted for use in heating spherical types of receptacles or vessels, such as spherical base flasks, retorts, or similar receptacles or containers having a generally spherical base portion. This type jacket is provided with an outer flexible casing 10 which is preferably formed from a flexible resin-impregnated woven glass fabric. The general hemispherical shape of the outer casing is obtained through proper stitching, as at 11, of separate panels, or by sewing a one-piece casing with suitable tucks and folds, necessary to obtain a hemispherical shape. The resin impregnation of the outer casing serves to prevent the same from being chemically attacked by certain acids of alkalies or other chemical reagents likely to come in contact with the outer casing of the jacket during laboratory experiments, and which, in some instances, might detrimentally affect glass fabric utilized in an unprotected or uncoated state.

Secured to the upper portion of the outer casing 10, as at 12, is the outer edge portion of a substantially hemispherical inner wall 13 which is also formed from a woven glass fabric, but which is unimpregnated by a synthetic resin material. The inner wall 13 is shaped so as to provide a substantially hemispherical pocket for the reception of the base portion of a cooperatively spherical receptacle or container, not shown. As shown particularly in Figs. 1 and 2 of the drawings, the inner wall 13 is of substantially one-piece construction, and is provided toward its vessel receiving opening with an upper rim portion 14 which actually joins the upper edge portion of the outer casing 10.

Disposed between the outer casing 10 and the inner wall 13, and maintaining the two in spaced relation, is a body of fibrous thermal insulating material 15, such as glass wool or the like. The body of thermal insulating material 15 is packed so as to present a substantially yieldable body, in conjunction with the flexible outer casing and inner wall. In this manner, the jacket is rendered capable of absorbing relatively severe and sharp internal and external forces which, in the absence of a cushioning medium, would normally result in breakage of a relatively fragile glass receptacle of the type positioned within the present jacket.

Figure 3:
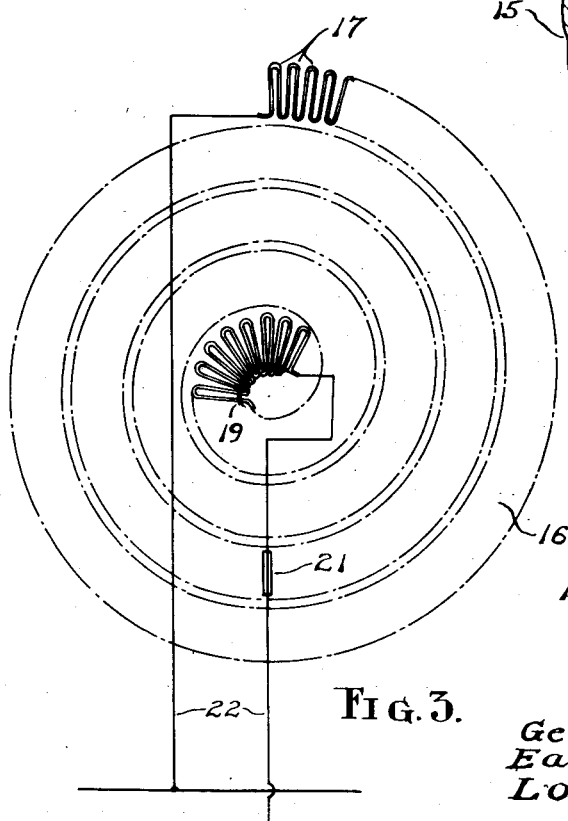
Fig. 3 is a top plan view of the knitted electrical heating element used in the heating jacket disclosed in Fig. 1, and disclosing in diagrammatic form the associated electrical circuit of the jacket.
Figure 6:
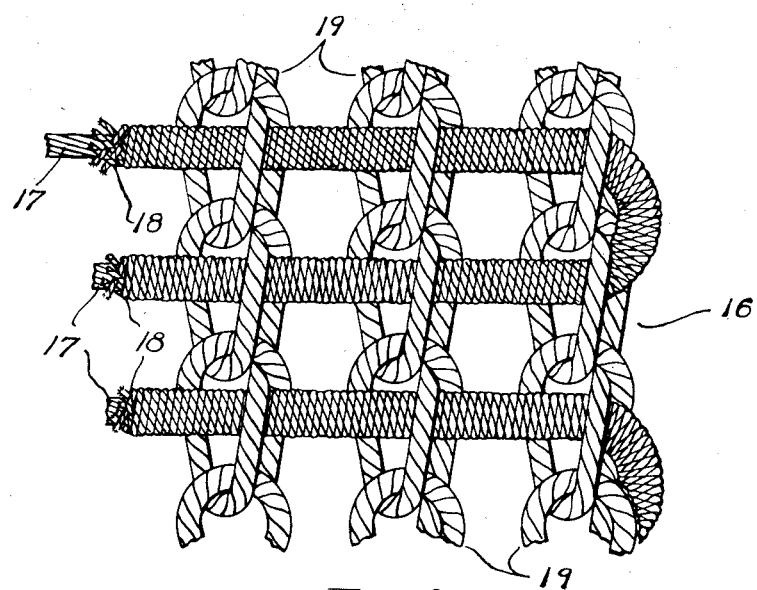
Fig. 6 is an enlarged fragmentary elevational view of a segment of heating element used in the present heating jackets.

Carried upon the outer surface of the inner wall 13 in spirally wound disposition, is a continuous strip 16 of integrally knitted and braided electrical resistance wire 17 and flexible threads 18 of glass fiber. As shown particularly in Figs. 2, 3 and 6 of the drawings, the resistance wire 17 is individually insulated by glass threads or fibers which are double braided about the resistance wire which is disposed in transverse convolutions throughout the length of the heating element strip 16. The individual convolutions of resistance wire and braided glass threads are united by a plurality of longitudinally disposed chain-knitted weft cords 19. The strip 16 is arranged upon the outer surface of the inner wall 13 in spirals of ever decreasing width, and the lower end of the strip terminates substantially at the flat bottom portion of the vessel-receiving pocket defined by the inner wall 13. Due to the relatively narrow width of the bottom spiral of the strip 16, it is necessary, in order to prevent overlapping of the individual convolutions of resistance wire, and the consequent formation of hot spots, to disengage the last few convolutions from the weft cords 19, in order that the bottom convolutions may be disposed in radial fanned-out disposition substantially in the bottom of the vessel-receiving pocket. The fanned-out disposition of the bottom spiral of the heating strip is particularly illustrated in Fig. 3 of the drawings, and is easily accomplished merely by disengaging the outer weft cords 19 from the last few convolutions of resistance wire. The heating element strip 16 is anchored throughout its length at suitable intervals to the inner wall 13 by glass anchoring threads 20.

Due to the transverse and closely spaced disposition of the individual convolutions of insulated resistance wire throughout the length of the strip 16, and the closely spiralled arrangement of the strip, it will be seen that a relatively great length of resistance wire is used over a relatively concentrated area. In utilizing such length of resistance wire a non-incandescent heating element is obtained with the voltage commensurate with a given desired operating temperature, such voltage being distributed over the relatively large wire area, whereby a given segment of wire does not attain an unduly high temperature sufficient to result in incandescence of the wire.

As shown particularly in Fig. 1 of the drawings, a bimetal thermostatic switch 21 is disposed within the present heating jacket, and is secured to the inner surface of the inner wall 13 in horizontal juxtaposition to a segment of the heating element strip 16, so as to be directly affected by the heat energy emanating from the heating element strip upon energization of the resistance wire. The bimetal thermostatic switch 21 is connected in series with the heating element strip 16, and is interposed within one of the lead wires 22 which are electrically connected with the respective ends of the resistance wire 17 internally of the inner wall 13, and extend through the outer casing 10 and terminate at a suitable electrical connector 23.

The thermostatic switch 21 is preferably of the preset open contact type which functions to open the operating circuit of the heating element of the jacket at a predetermined maximum operating temperature. The switch serves an important function with electrical heating jackets of this general character in that the same prevents overheating of the element in the event that the contents of a flask or other receptacle positioned within the pocket of the jacket is completely evaporated or discharged from the receptacle whereby such contents are no longer capable of absorbing the heat energy transmitted by the heating element 16. It will be understood, that in utilizing glass fiber and fabric, operating temperatures in the neighborhood of 800° F. may be encountered without detrimental effect upon the jacket or the individual parts thereof. However, while relatively extreme temperatures are encountered by the continued operation of the heater in the absence of a medium capable of absorbing such heat, the glass comprising the jacket may readily be melted or rendered in a molten state, in the absence of a thermo-responsive element of this type. The present invention further contemplates the use of leached-type glass fibers which are more highly heat-resistant, thereby making possible considerably higher operational temperatures without fear of melting the glass fiber or encountering other detrimental effects upon the jacket.

In addition to the thermostatic switch 21, the present heating jackets make use of a thermocouple 24 which is also arranged in horizontal juxtaposition to a segment of the heating element strip 16, and secured to the inner surface of the inner wall 13, in order to be directly affected by the heat energy created upon energization of the heating element. The thermocouple 24 is provided with lead wires 25 which extend exteriorly of the outer casing of the jacket, in order that the same may be suitably electrically connected with an electrical temperature recording apparatus or meter, not shown. The thermocouple makes possible an accurate determination of the operating temperature of the heating element within the jacket, and through use of a suitable measuring instrumentality, the operating temperature of the jacket may be controlled through intermittent manual opening and closing of the electrical circuit of the heating element, or through proper voltage regulation of the operating circuit.

Figure 4:
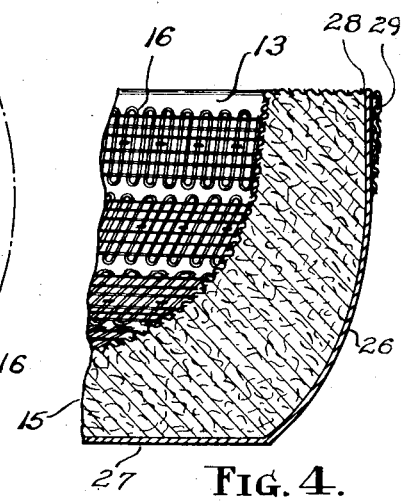
Fig. 4 is a vertical sectional view, similar to that shown in Fig. 2, taken through a slightly modified type of heating jacket which embodies a rigid outer casing.

Fig. 4 of the drawings discloses a slightly modified type of hemispherical flask heater, wherein the outer casing 26 thereof constitutes a substantially rigid or semi-rigid structure provided by impregnating a layer of glass matte or flock with a suitable rigid synthetic resin. In this instance, the outer casing is preferably provided with a flattened bottom portion 27, and affords a rigid supporting base for the remainder of the heating jacket, as well as a receptacle positioned therein. The rigid type of heating jacket is advantageous in some instances, as the same provides an independent support, rather than depending upon independent ring supports or clamps of the type ordinarily utilized in the laboratory for supporting instrumentalities in an elevated position. Additionally the resin impregnated outer casing is tough and durable and highly resistant to wear and heat. The inner wall 13 of the rigid outer casing type of jacket is secured to the outer casing by overlapping the upper edges thereof, as at 28, and by application of a connecting band 29 of glass fabric material which encircles the upper outer portion of the rigid outer casing 26, and is adhesively united with both the outer casing and the overlapping portion of the inner wall.

Figure 5:
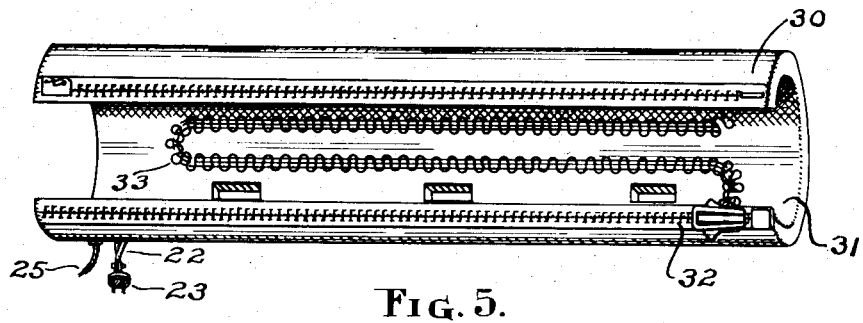
Fig. 5 is a perspective view of a modified type of flexible heating jacket used in connection with tubular laboratory apparatus.

Fig. 5 of the drawing illustrates still another modification of the present invention wherein a generally tubular-shaped electrical heating jacket is disclosed, the same making use of a split type circular outer casing 30, and a split inner wall 31 disposed in spaced relation to the outer casing by an inner packing of fibrous glass wool or other suitable thermal-insulating material, not shown. This tubular type of heating jacket is particularly adaptable for use in heating distillation tubes and the like, or segmentated portions thereof. The tubular jacket is provided along its free longitudinal edges with a slide fastener device 32 by which the same may be enclosed around a tubular receptacle or conduit. The tubular type of jacket is likewise provided upon the outer surface of the inner wall 31 with a continuous heating element strip 33 which may be arranged in generally longitudinally convolute disposition along the inner wall as shown in Fig. 5 or may be disposed circumferentially about the inner wall with the individual convolutions of resistance wire being arranged transversely throughout the length of the strip. The tubular type of jacket is also provided with a thermostatic switch and thermocouple of the type previously outlined with reference to the hemispherical type of jackets. If desired, the tubular type of jacket may be provided with edge flaps, not shown, which cover the slide fastener effect in order to prevent loss of heat through the adjoining edges of the jacket.

In view of the foregoing, it will be seen that the present invention provides improved electrical heating jackets particularly adaptable for use in heating various types of laboratory receptacles and containers. A distinct advantage is ambient to the present heating jackets through the provision of the integrally knitted and braided type of heat-resistant and electrical insulating glass fiber threads and resistance wire, the same being disposed for direct contact with a vessel to receive heat energy from the jacket. Further, through the provision of the pre-set thermostatic switch element, numerous hazardous operations are eliminated by preventing overheating of the associated electrical heating element and the article to be heated by the jacket, by fixing the maximum operating temperature of the jacket.

A further improvement resides in the method of arrangement of the lowermost spiral of the heating element in the hemispherical type of heating jacket, whereby overlapping or tucking of the individual convolutions of resistance wire is eliminated, due to the fan-shaped disposition of the closely arranged bottom convolutions of the heating element.

It will be understood, that in the case of relatively large heating jackets, multiple heating elements and circuits may be utilized instead of a single heating element and circuit, in order to obtain relatively high operational temperatures. Also, in the formation of relatively large heating jackets, particularly the flexible type, it is oftentimes desirable to utilize an internal frame structure or metallic wire basket within the fibrous thermal insulating material, to maintain the overall structure in a given shape and prevent the same from sagging or becoming distorted with respect to the shape of a particular vessel or conduit to be heated thereby.

We claim:

1. An electrical heating device of the character described comprising an outer substantially hemispherical wall of thermal and electrical insulating material, a flexible and substantially hemispherical inner wall of thermal and electrical insulating material disposed in spaced relation to said outer wall and forming a concave pocket for the reception of a container, a flexible body of fibrous thermal insulating material disposed between said inner and outer walls, a continuous flexible strip of integrally knitted and braided resistance wire and thermal and electrical insulating material carried in spiralled disposition upon said inner wall within the pocket formed thereby, said resistance wire being disposed in transverse convolutions throughout the length of said strip, the individual convolutions of said resistance wire being united by knitted threads of thermal and electrical insulating material, a portion of the convolutions of resistance wire at one end of said strip being disengaged from the knitted threads thereof and secured to said inner wall at the bottom of the pocket in radial fan-shaped order.

2. In an electrical heating device for laboratory flasks; an outer casing formed from thermal and electrical insulating material and including a flexible and substantially hemispherical inner wall of woven glass fibers defining in said casing an open-mouthed concave pocket for the reception of a portion at least of a laboratory flask; and an electrical heating element secured in spiral disposition to the outer surface of the inner wall of said casing and extending from the open mouth to the bottom of the pocket defined by the inner wall of said casing for direct engagement with a flask positioned therein, said heating element consisting of a continuous length of electrical resistance wire arranged in transverse convolutions throughout the length of said heating element, an outer tubular covering of braided glass fibers completely covering said resistance wire throughout its length, and knitted strands of glass fibers extending longitudinally of said heating element and uniting the individual convolutions of covered resistance wire, the individual convolutions of resistance wire, throughout a major portion of said heating element, being disposed in spaced parallel non-shorting relation, and a portion of the convolutions of resistance wire disposed in the bottom of said pocket being disengaged from the knitted strands of glass fibers and individually secured to the inner wall of said casing in radial fan-shaped order.

EARNEST H. BRISCOE.
GEORGE A. STONE.
LORRIN C. TARLTON.

REFERENCES CITED

The following references are of record in the file of this patent:

UNITED STATES PATENTS

| Number | Name | Date |
|---|---|---|
| 1,657,479 | MacFarland | Jan. 31, 1928 |
| 2,038,275 | Fogg | Apr. 21, 1936 |
| 2,157,606 | Harris | May 9, 1939 |
| 2,231,506 | Morey | Feb. 11, 1941 |
| 2,282,078 | Morey | May 5, 1942 |
| 2,339,409 | Joy et al. | Jan. 18, 1944 |
| 2,397,568 | Seaman | Apr. 2, 1946 |
| 2,419,848 | Morey | Apr. 29, 1947 |
| 2,482,665 | Geyer | Sept. 20, 1949 |